United States Patent [19]

Stark

[11] 3,886,271

[45] May 27, 1975

[54] ANTIFUNGAL ANTIBIOTIC

[76] Inventor: Ronald Stark, 336 W. 12th St., New York, N.Y. 10010

[22] Filed: Dec. 29, 1972

[21] Appl. No.: 319,491

Related U.S. Application Data

[63] Continuation of Ser. No. 764,037, Sept. 24, 1968, abandoned, which is a continuation of Ser. No. 600,389, Dec. 9, 1966, abandoned.

[52] U.S. Cl.............................. 424/115; 195/80 R
[51] Int. Cl............................................ A61k 21/00
[58] Field of Search .............. 424/116, 115; 195/80

[56] References Cited

OTHER PUBLICATIONS

Dorland, Medical Dictionary, 18th Edition, 1938, pages 1397 and 1398.

*Primary Examiner*—Jerome D. Goldberg

[57] ABSTRACT

This invention is concerned with an antimicrobial agent and the production thereof.

2 Claims, No Drawings

AN ANTIFUNGAL ANTIBIOTIC

This is a continuation of application Ser. No. 764,037 filed Sept. 24, 1968, now abandoned, which in turn is a continuation of application Ser. No. 600,389 filed Dec. 9, 1966, now abandoned.

The present invention is concerned with a new and novel antimicrobial agent and the production thereof. More particularly, the present invention is concerned with an antimicrobial agent produced from a culture of the organism streptomycedes sp 168 which has been deposited at the American type culture collection, and which has been assigned accession No. ATCC 21001. Strain No. 168 was produced from soil samples from the New York metropolitan area. The culturing of the soil sample resulted in the production of streptomycedes sp 168 accession No. ATCC 21001 and other products which have been isolated and which have activity in the nature of or related to antibiotics.

The soil samples used were obtained from the New york metropolitan area; culture 168 was isolated from other cultures coproduced, and further cultured and treated to produce the antimicrobial agent of the present case. This antimicrobial agent comprises a mixture or complex of at least two compounds showing antifungal activity.

These soil samples were cultured in a medium containing the following components expressed in grams per liter:

20 glycerol
2.5 L-arginine
1.0 NaCl
0.1 $CaCO_3$
0.1 $FeSO_4 \cdot 7 H_2O$
0.1 $MgSO_4 \cdot 7 H_2O$
0.05 cyclohexamide
20 agar The soil sample was cultured in the medium at a temperature of from about 22° to about 37°C. and at an approximately neutral pH for a period of 3 to 8 days until maximum inhibition by disc assay was obtained. At that time culture 168 was isolated from other cultures coproduced by conventional cloning techniques. The compounds produced by the organism from Culture 168 are useful because they show antifungal activity in vitro against organisms of the genus aspergillus, penicillum, fusarium, alterarria and trichoderma. Upon oral administration it was not possible to demonstrate toxicity in NZB/BL mice. Upon parenteral administration low toxicity was observed in Balb/c mice. The antifungal agent's uses include (1) human and animal systemic disease; (2) human and animal topic disease; (3) food and natural product preservation; (4) plant protection and treatment; and (5) as a fungus control and/or preventive agent.

The antifungal agent may be utilized and administered in the same general manner as known antifungal agents.

The strain 168 isolated from the soil samples as above described after the initial culturing, can be further cultured in agar slant tubes, on agar petri dish, shake flasks and fermenters. According to a preferred embodiment of the present invention, a shake flask or series of shake flasks are inoculated with the following medium:

1% soy flour
1% glucose
0.1% molasses
0.1% $K_2HPO_4$
0.5% corn steep liquor
tap water q.s. The pH is adjusted to about neutrality and the flasks are autoclaved for 25 minutes at a pressure of 15 p.s.i.g. An innoculum of strain 168 is added and culturing proceeds at a temperature of from about 25° to 30°C. for at least about 2 days and preferably about 4 to 6 days or more.

When fermenters are used, the fermentation medium is preferably comprised of the following:

1.5% soy flour
1.5% glucose
1.0 % corn steep liquor
0.5% glycerol
0.3% NaCl
0.2% Brewer's yeast
0.2% $CaCO_3$
0.1% $NH_4NO_3$
tap water q.s.

After the medium is placed in the fermentor, the pH is adjusted to about neutrality and autoclaved about 25 minutes at a pressure of 15 p.s.i.g. An innoculum of strain 168 is added and fermentation is then allowed to proceed for a period of four to 6 days at a temperature of from 25° to 30°C.

When bioassay demonstrates maximal activity, the pH is adjusted to about neutrality and sufficient Celite 535 or other suitable filter aid is added so that the fermentation broth contains 1% Celite 535. The broth is then filtered on a bed of Celite 535 on a buchner funnel under negative pressure to separate the broth into filtrate and cells. The antifungal agent is recovered with a water insoluble alcohol extraction. Butanol is especially preferred. Normally two successive alcohol extractions are sufficient. The alcohol extraction is carried out using 2 parts alcohol to 1 part filtrate and 2.8 liters of alcohol per kilogram of cells. The alcohol is then concentrated in a rotary flash evaporator with a water bath maintained at a temperature of about 45°C. The concentrate obtained is treated with 10 volumes of petroleum ether to precipitate the antifungal agent. It is upon this crude antifungal agent that all tests were performed. This crude solid is soluble in polar organic solvents such as alcohols, dimethylsulfoxide, and dimethylformamide, but substantially insoluble in water.

It has been discovered that the cells and the filtrate contain approximately equal amounts of the antifungal agent and a procedure for eliminating the separation of cells from filtrate is accomplished by adding two parts alcohol to one part broth. Under these conditions, the alcohol and broth were agitated for one hour at ambient temperature and then filtered on a bed of Celite 535 or other suitable filter aid. This extraction was repeated twice, and upon separation into two phases, the aqueous phase was discarded. The alcohol was concentrated approximately 50 times in a rotary flash evaporator, with the water bath set at about 45°C., and petroleum ether was added in a ratio of 10:1. The resulting product is a gummy material to which is added 5 ml of ethyl ether per gram of gummy material and is ground in a mortar with a pestle to produce a solid. The ether is discarded and the remaining solids are transferred to a jar in a desiccator at low vacuum.

Biological activity was tested in vitro by disc assay and minimal inhibitory concentration.

The crude antifungal agent in solid form produced as above described was dissolved in ethanol or dimethylsulfoxide and the resulting solution was added to agar and poured on a pan of approximately one-quarter to 1 inch thick. Into cultures of fungi, paper discs 6 mm were dipped and these were placed on the agar. Minimal inhibitory concentration was defined as that concentration of antifungal agent in the agar required in order to permit no growth of fungus. The pans were prepared with varying concentrations of the antifungal agent. The fungi were grown for periods up to 10 days. Any growth was considered to be outside of the minimal inhibitory concentration and no quantitation of partial inhibition was made.

By this technique the following organisms were inhibited at the level of 1 to 100 mcg per ml:

Aspergillus favus   Fusarium oxysporum
Aspergillus niger   Altenaria tenius
Penicillium digitatum A butanol extract of the crude antifungal agent also had the minimal inhibitory activity of 1 to 100 mcg per ml against the following organisms:

Aspergillus flavus   Fusarium oxysporum
Aspergillus niger    Trichoderma viride
Penicillium digitatum By assay on agar plates, activity was exhibited against candida albicans and coccidioides at less than 200 mcg per ml. Using suspensions of cultures with rototorula, a crude isolate of the agent is active at a concentration of about 0.5 mcg per ml. A crude isolate of the agent is active against coccidioides immitis at a level of 1 to 2 mcg per ml. Attempts to study the sensitizing effect of this extract demonstrated no sensitivity and no sensitivity as a haptenic carrier employing Ovary's technique of passive cutaneous anaphylaxis in guinea pigs.

Thin layer chromatography was also carried out. A thin layer glass plate was poured with powdered cellulose and 15% $CaSO_4$ was used as a binder. 10 mg of the antifungal agent was dissolved per milliliter of methanol and the plate was spotted with ten microliters of the solution. The developing solvent is the upper phase of the mixture of 4 parts butanol, 1 part methanol and 5 parts water. The plate was permitted to develop for ten centimeters. Agar inoculated with 1% paecilomyces variati was poured. Incubation was carried out about sixteen hours at about 35°C. and two distinct zones of inhibition with $R_f$ value of 0.75 and 0.45, respectively, were observed. A trace was observed near the origin and this may represent a third component which is insoluble in methanol and the developing agent and therefore did not migrate.

Purification of the crude antifungal solid has been carried out in a Craig Countercurrent Distribution Apparatus in the following manner: 10 grams of the crude antifungal solid were added into a 200 tube machine employing a solvent system comprising 2 parts cyclohexane, 2 parts butanol, 1 part ethanol and 5 parts water. Antifungal activity was found in tubes 149 to 196. Tubes 163 to 173 when brought to dryness represented 500 milligrams of a five fold purified material. The standard for purification was minimal inhibitory concentration against paecilomyces varitai.

The toxicity of the antifungal agent produced was investigated by tests on NZB/BL mice which were given the antifungal agent orally. Even though a crude solid was employed no toxicity could be established on the basis of the tests conducted against 20 mice. None of the mice could be fed a sufficient amount of the antifungal agent to produce death. The only exception was the occurrence of two deaths due to regurgitation of the material from the stomach. As much as 10 grams per kilogram of body weight was given to mice to acute toxicity tests, and 50 milligrams per kilogram of body weight was given in the chromic toxicity tests. The chronic dosage was on a five day schedule for three weeks. Three weeks after the completion of the chronic schedule, the animals were sacrificed and no gross or microscopic pathology could be observed.

Parenteral toxicity was studied acutely by giving 20 mice varying amounts ranging from about 10 mg to 100 mg per kilogram of antifungal agent dissolved in a minimum volume of dimethylsulfoxide. Three weeks after completion of administration, the animals were sacrificed and no gross or microscopic pathology was observed.

Acute parenteral toxicity was studied by dissolving 500 mg of crude butanol extract in 1 ml of ethanol and diluting the mixture to 5 ml with water to give a suspension of 100 mg per ml after the addition of 0.2 ml Tween 80. An $LD_{50}$ in Balb/c mice of 250 mg per kg was found with this solution. Because of the solvents used, the toxicity at this level is not entirely attributable to crude agent for at this concentration, butanol, ethanol and Tween 80 exhibit toxicity in mice.

An elemented analysis of the purified complex indicated that the simplest empirical formula is $C_{17}H_{30}O_9N$. No sulphur or halogens was found.

What is claimed is:

1. A process for the production of an anti-fungal antibiotic which comprises cultivating the steptomycedes organism ATCC 21001 in an acqueous nutrient medium under aerobic conditions, until a sufficient amount of anti-fungal action is imparted to said medium, and recovering the anti-fungal antibiotic therefrom.

2. An anti-fungal antibiotic produced by the process of claim 1.

* * * * *